(12) United States Patent
Lamm et al.

(10) Patent No.: US 6,408,238 B1
(45) Date of Patent: Jun. 18, 2002

(54) METHOD AND APPARATUS OF CONTROLLING A SLIDING ROOF

(75) Inventors: Hubert Lamm, Kappelrodeck; Guenter Haderer, Buehl, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/486,035

(22) PCT Filed: May 27, 1999

(86) PCT No.: PCT/DE99/01552

§ 371 (c)(1),
(2), (4) Date: May 12, 2000

(87) PCT Pub. No.: WO99/65717

PCT Pub. Date: Dec. 23, 1999

(30) Foreign Application Priority Data

Jun. 18, 1998 (DE) ............... 198 27 110

(51) Int. Cl.$^7$ .................. H02H 7/085; B60J 7/057
(52) U.S. Cl. ..................... 701/49; 701/36
(58) Field of Search ............. 701/36, 49; 324/468, 324/469, 283; 49/26, 28

(56) References Cited

U.S. PATENT DOCUMENTS

| | | | | |
|---|---|---|---|---|
| 5,723,960 A | * | 3/1998 | Harada | 318/469 |
| 5,801,501 A | * | 9/1998 | Redelberger | 318/283 |
| 5,977,732 A | * | 11/1999 | Matsumoto | 318/283 |
| 6,239,610 B1 | * | 5/2001 | Knecht et al. | 324/772 |

FOREIGN PATENT DOCUMENTS

| | | |
|---|---|---|
| DE | 196 15 123 | 7/1997 |
| JP | 59 190020 | 10/1984 |
| JP | 10054175 | 2/1998 |
| WO | WO-39508 A1 * | 10/1997 |

* cited by examiner

*Primary Examiner*—Michael J. Zanelli
(74) *Attorney, Agent, or Firm*—Kenyon & Kenyon

(57) ABSTRACT

A method of controlling a sliding roof, where braking of a vehicle is detected by a controller of the sliding roof device, and the pinch protection, i.e., the closing force limiter, is corrected so that faulty reversal of the sliding roof is suppressed when the vehicle is decelerating and the roof is being closed at the same time.

10 Claims, 2 Drawing Sheets

METHOD AND APPARATUS OF CONTROLLING A SLIDING ROOF

BACKGROUND INFORMATION

The present invention is based on a method of controlling a sliding roof.

A method of electronic monitoring of an adjusting drive arranged in a motor vehicle, in particular a sliding roof drive, is known from German Published Patent Application No. 196 15 123, where a measured quantity detected by a sensor in closing the roof is compared with a threshold value for the closing force limiter for the purpose of guaranteeing, pinch protection, and when the threshold value is reached, the drive motor is turned off and/or reversed. Reaching, the threshold value thus represents a pinch criterion and leads to release of the object, such as an arm or neck, pinched between the adjusting part and a stop of the adjusting part.

In addition, the threshold value is adapted to the speed-dependent force and pressure conditions on the adjusting part, i.e., the sliding roof cover, in that the vehicle velocity is analyzed by using a tachometer signal sent to the adjusting drive. This prevents unwanted triggering of the closing, force limiter, i.e., the pinch protection, because of the forces occurring on the adjusting part at high speeds without there being an actual pinch situation. Consequently, threshold values can be adjusted as a function of speed.

However, this does not detect acceleration of the vehicle, e.g., full braking. The closing of a sliding, roof takes place more easily in negatively accelerated systems than in unaccelerated systems. This leads to the problem that the positive acceleration of the sliding roof cover in the closing direction caused by a negative acceleration of the vehicle during the closing operation of a sliding roof and consequently also the related increase in rotational speed of the drive motor are not detected. A subsequent reduction in acceleration, in particular due to stopping the vehicle, leads to a reduction in rotational speed of the sliding roof motor. This reduction in rotational speed is interpreted as a pinch criterion, so the pinch protection responds and the sliding roof is stopped and/or reversed in an unwanted manner.

SUMMARY OF THE INVENTION

The method according to the present invention has the advantage that braking of a vehicle is detected by a controller of the sliding roof device, and the pinch protection, i.e., the closing force limiter, is corrected so that faulty reversal of the sliding roof is suppressed when the vehicle is decelerating or stops in particular while the roof is closing.

It is especially advantageous that the controller determines from the input signals at least one acceleration value of the vehicle and compares this value with a limit value. Reaching the limit value is interpreted as full braking of the vehicle and leads to correction of the pinch protection. This correction of the pinch protection is reversed by the controller after braking.

The method is improved because not only one acceleration value is used but instead a plurality of acceleration values is used, preferably two, each of which is compared with a predetermined limit value. On reaching both limit values, full braking of the vehicle is then deduced and the pinch protection is corrected.

Preferably the acceleration values are obtained from a speed signal in particular a tachometer signal which is sent to the controller. The tachometer signals are stored temporarily in succession in a ring memory. The acceleration values are determined by forming the difference in an electronic analyzer.

The determination of a pinch situation is based, for example, on a determination of the rotational speed of a motor armature shaft and a comparison of the rotational speed with a threshold value for the closing force limiter, so that a correction of the pinch protection is performed by correcting the threshold value, preferably increasing it.

DETAILED DESCRIPTION

Figure 1:
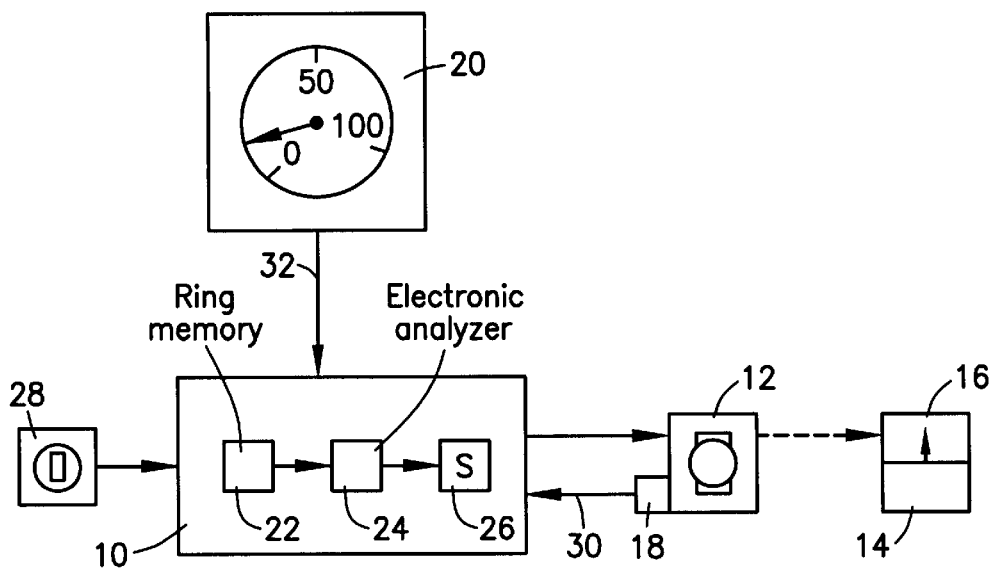
FIG. 1 shows a block diagram of the device for controlling a sliding roof.

FIG. 1 shows a schematic diagram of a device for controlling a sliding roof with a controller 10 which an electric drive motor 12 for moving a sliding roof 14 within an adjustment path. Sliding roof 14 closes or opens a sliding roof opening 16. A sensor 18, e.g., a Hall sensor or an incremental value pickup that delivers rpm-dependent pulses 30 to controller 10 for determination of the position and/or rotational speed of sliding roof 14 is arranged on motor 12. These pulses are compared with a threshold value S in a comparator 26 to guarantee pinch protection.

In one embodiment, additional input signals 32 from a tachometer 20 are sent to controller 10 as a means for detecting the vehicle speed, are stored temporarily in a ring memory 22 of controller 10 and are analyzed in an electronic analyzer 24 of controller 10 to detect braking of the vehicle.

In addition, a setpoint position of sliding roof 14 is preselected by an operating element 28, thus causing the roof to be opened or closed by the user. Determination of the rotational speed of motor 12 is usually used for regulating the position or rotational speed of sliding, roof 14 by controller 10 according to the setpoint preselected by the user.

The device of the present invention may also be used to control a sliding roof, preferably on a motor vehicle, having a reversible drive motor (12) and a controller (10) for controlling the motor (12) having a pinch protection (18,30, 26) and also having means (20) for detecting the vehicle speed and/or acceleration of the vehicle, where the means (20) deliver signals (32) to the controller (10). According to one aspect of the present invention, a tachometer of the vehicle can be used as the means (20) for detecting the vehicle speed and/or acceleration of the vehicle. The controller (10) detects braking of the vehicle, in particular full braking, on the basis of the signals (32) and corrects the pinch protection on the basis thereof.

Figure 2:
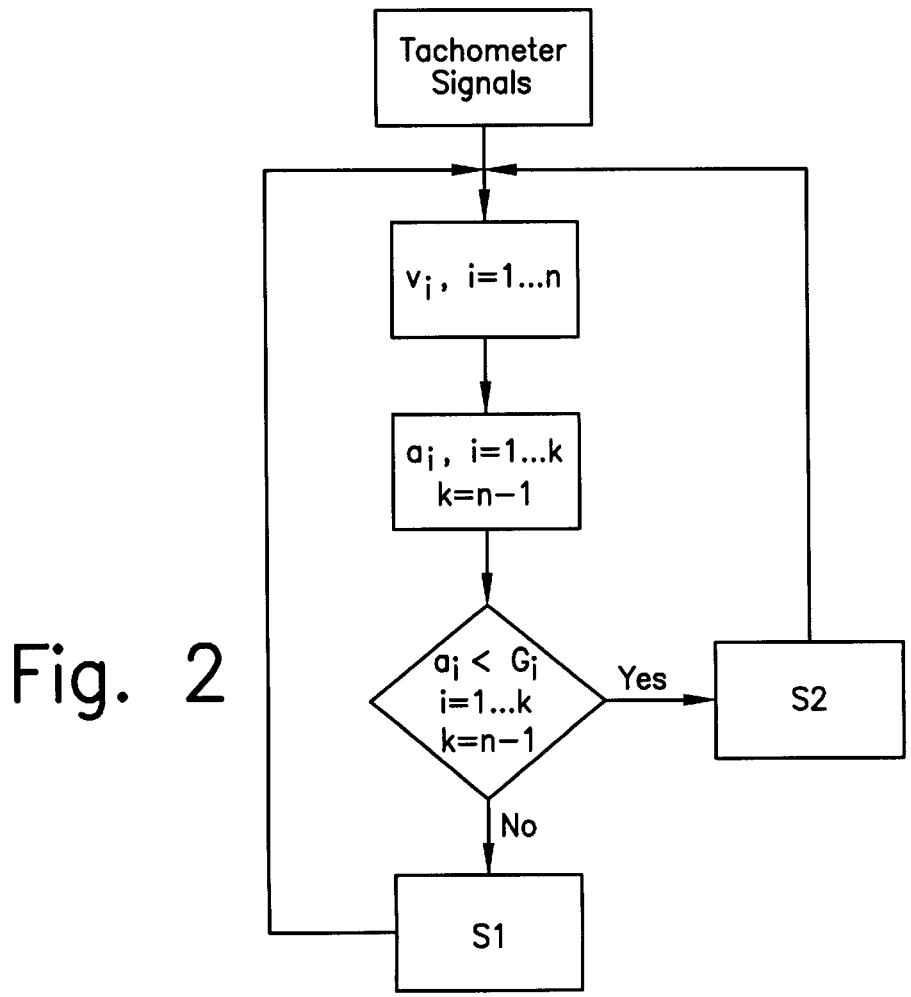
FIG. 2 shows a flow chart for one embodiment of the method according to the present invention for controlling a sliding roof.
Figure 3:
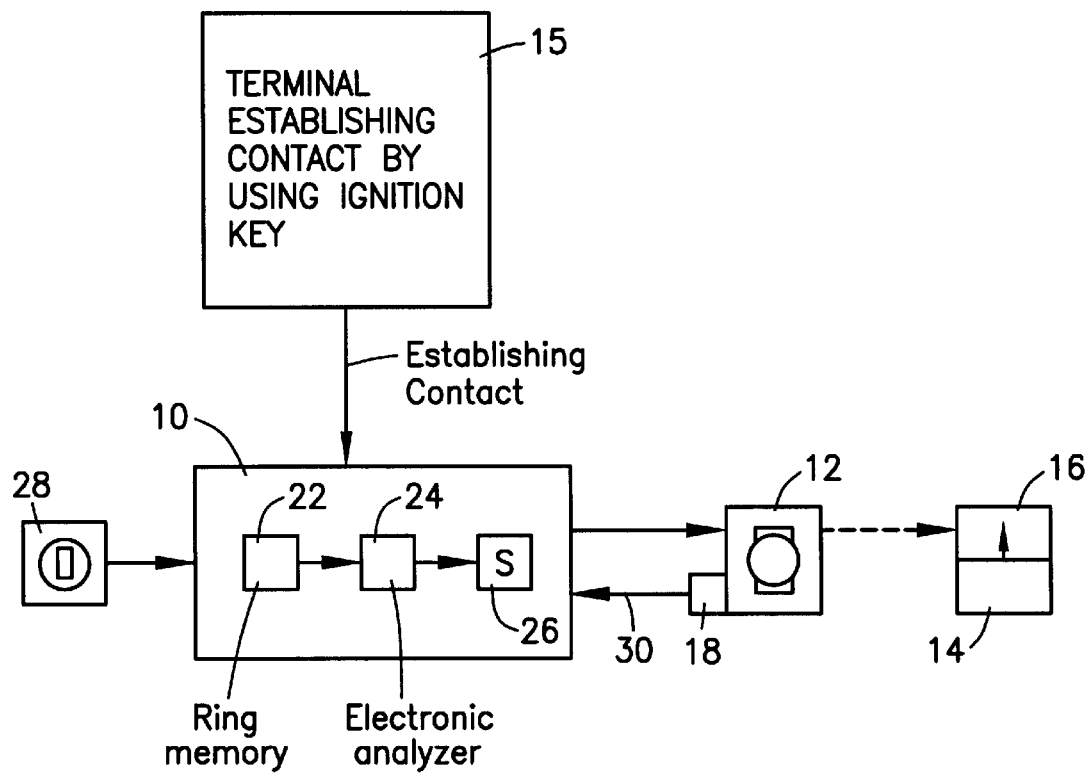
FIG. 3 shows a flow chart for an alternative embodiment of the method according to the present invention for controlling a sliding roof.

FIG. 2 shows a flow chart for detecting negative acceleration a of the vehicle from tachometer signals 32.

The method according to the present invention will now be described on the basis of the device according to FIG. 1. In the first step, the start of the method is initiated by establishing contact (terminal 15) by using an ignition key in the ignition lock, for example, or controller 10 receives tachometer signals 32. Input signals 32 are usually in the form of a pulse train which is assigned a time base in controller 10, so that speed values v can be calculated from this pulse train. Speed values $v_i$ (i=1, ... n) determined successively in constant time intervals are stored temporarily in ring memory 22. This ring memory is designed for n places, so that after a startup phase, the n memory places in ring memory 22 are occupied by $v_1$ through $v_n$ speed values. According to one aspect of the present invention, the predetermined number (n) is greater than three and less than six. With each successive new speed value $v_{n+1}$ ring memory 22 is updated by the allocation $v_{n+1} \rightarrow v_n$.

In the following step, electronic analyzer 24 determines a total of k acceleration values $a_i$ (i=1, ... k and k=n−1) from the differences in n speed values $v_{i+1}-v_i$. Thus, with n=3 speed values $v_1, v_2, v_3$, in ring memory 22, k=2 acceleration values $a_1, a_2$ are formed in electronic analyzer 24. These have a negative value in the case of braking of the vehicle.

Resulting acceleration values ai are compared with limit values Gi (i=1, ... k) deposited in controller 10. For example, if all acceleration values ai or all except one are greater than respectively predetermined limit values Gi, no critical braking of the vehicle, in particular full braking, is detected by controller 10, i.e., the vehicle acceleration is in a noncritical range with respect to pinch protection. Thus, the parameters for the pinch protection of sliding roof 14 remain unchanged. Any correction of the pinch protection (identifier for a closing force limiter) that might have been set previously is deleted.

If all acceleration values ai (negative value) are below all predetermined limit values Gi, then controller 10 recognizes a critical vehicle braking, e.g., full braking, and sets an identifier for the closing force limiter, i.e., corrects one or more parameters for the pinch protection.

A possible pinch protection and the changes caused by the identifier are described below as an example. For the purpose of detecting a pinch situation, sensor 18 is mounted on a moving, part of motor 12, for example on the motor shaft or a drive gear, so that it detects characteristic quantities 30 as a function of the adjusting motion of sliding roof 14.

Characteristic quantity 30 is a measure of the rotational speed of the motor armature shaft, for example. According to another aspect of the present invention, the characteristic quantity (30) is a motor current, a motor rotational speed, a torque or displacement pulses or a quantity derived from them. Characteristic quantity 30 is sent to controller 10 and is analyzed with regard to a pinch situation. A pinch situation occurs due to, for example, an arm or any other object coming between roof edge 16 and sliding roof 14 while the roof is closing and a pinching force or closing force being exerted on the object by sliding roof 14. A pinch protection guarantees that the pinching force exerted on the object will remain below a predetermined threshold value S1, taking into account statutory standards and regulations. Motor 12 is usually stopped or reversed in reaction to a known pinch situation and sliding roof 14 is opened again. Thus, the pinched object is released.

With a pinch protection with analysis of the rotational speed, rotational speed 30 is compared with the predetermined threshold value. Rotational speed 30 is correlated with the torque exerted by way of the motor characteristics map and thus the applied motor voltage. The torque is in a linear relationship with the adjusting force of roof 14 and thus also the pinching force in a pinch case.

In an unaccelerated motor vehicle, threshold value S1 corresponds to the threshold values stipulated by law, e.g., a pinch force of 100 newtons.

In an accelerated motor vehicle, the acceleration also acts on sliding roof 14 and thus indirectly also on rotational speed 30 of the motor armature shaft in the closing of sliding roof 14. With a negative acceleration a, rotational speed 30 is increased. Thus, if the vehicle comes to a standstill after negative acceleration a, rotational speed 30 of motor 12 is reduced again. This is erroneously detected by the controller as a pinch situation and leads to a faulty reversal of sliding roof 14.

This behavior also occurs with a great positive acceleration of the motor vehicle, e.g., rapid starting of the vehicle and a sensitive setting of the pinch protection. Due to the method according to the present invention, unwanted reversal here can also be prevented.

If controller 10 then detects a negative acceleration by the method according to FIG. 2, then setting an identifier for the closing force limiter causes inactivation of the pinch protection, for example, or selection of another corrected threshold value S2. Additional threshold value S2 is then lower than uncorrected threshold value S1.

Limit values Gi, with which acceleration values ai are compared, are determined experimentally in advance with different sliding roofs 14 and different vehicles for the purpose of optimizing the method according to the present invention. Then the mass of sliding roof 14, inter alia, enters into this optimization as a parameter. For reliable detection of braking of the vehicle, preferably at least two acceleration values and at most five acceleration values are calculated and stored in electronic analyzer 24.

The method according to the present invention can be used not only with a sliding roof 14 but also with a sliding and lifting roof, automatic window winders, swing-out windows, etc., where acceleration of the vehicle—either positive or negative—has an unwanted effect on pinch protection.

In an alternative embodiment, a displacement sensor is arranged on the brake pedal of the motor vehicle instead of using a tachometer 20. This displacement sensor thus detects actuation of the vehicle brake based on a time base. Rapid or slow actuation of the vehicle brake, i.e.. the brake pedal, can thus be differentiated and full braking of the vehicle can be detected by controller 10. The closing force limiter is then corrected as described above.

What is claimed is:

1. A method of controlling a sliding roof disposed on a motor vehicle and including a controller, a reversible drive motor that provides a pinch protection and is controlled by the controller, and a detection arrangement for detecting at least one of a vehicle speed and a vehicle acceleration, comprising the steps of:

causing the detection arrangement to deliver signals to the controller;

causing the controller to sense a braking of the vehicle on the basis of the delivered signals; and causing the controller to correct the pinch protection on the basis of the delivered signals.

2. The method according to claim 1, wherein the braking corresponds to a full braking.

3. The method according to claim 1, wherein the controller:

determines from the delivered signals an acceleration value at least in the braking, compares the acceleration value with at least one limit value, and corrects the pinch protection on reaching the limit value.

4. The method according to claim 1, wherein:

the delivered signals are sent to the controller in cycles, the delivered signals correspond to speed values of the vehicle, a predetermined number of the speed values is stored temporarily in a ring memory of the controller, and an electronic analyzer of the controller forms acceleration values from differences of respective speed values.

5. The method according to claim 4, wherein:

the predetermined number is greater than three and less than six.

6. The method according to claim 1, further comprising the steps of:

causing a sensor to detect at least one load-dependent characteristic quantity;

sending the at least one load-dependent characteristic quantity to the controller;

comparing the at least one load-dependent characteristic quantity with a first threshold value in the controller;

detecting a pinch situation as a function of a result of the comparison;

triggering the pinch protection; and causing the controller to set a second, corrected threshold value for a second, corrected pinch protection when the vehicle is braked.

7. The method according to claim 6, wherein:

the pinch protection corresponds to a reversing of the motor.

8. The method according to claim 6, wherein:

the at least one load-dependent characteristic quantity is one of a motor current, a motor rotational speed, a torque, displacement pulses, and a quantity derived from the motor current, the motor rotational speed, the torque, and the displacement pulses.

9. A device for controlling a sliding roof disposed on a motor vehicle and including a controller, a reversible drive motor that provides a pinch protection and is controlled by the controller, and a detection arrangement including a tachometer for detecting at least one of a vehicle speed and a vehicle acceleration, comprising:

an arrangement for causing the detecting arrangement to deliver signals to the controller;

an arrangement for causing the controller to sense a braking of the vehicle on the basis of the delivered signals; and an arrangement for causing the controller to correct the pinch protection on the basis of the delivered signals.

10. The device according to claim 9, wherein the controller includes:

a ring memory for storing the delivered signals, and an electronic analyzer for calculating the acceleration from the delivered signals.

* * * * *